US007813824B2

(12) United States Patent
Takahama

(10) Patent No.: US 7,813,824 B2
(45) Date of Patent: Oct. 12, 2010

(54) TRANSMISSION SIGNAL PROCESSING DEVICE FOR VIDEO SIGNAL AND MULTI-CHANNEL AUDIO SIGNAL, AND VIDEO AND AUDIO REPRODUCING SYSTEM INCLUDING THE SAME

(75) Inventor: Koji Takahama, Neyagawa (JP)

(73) Assignee: Onkyo Corporation, Neyagawa-shi (JP)

( * ) Notice: Subject to any disclaimer, the term of this patent is extended or adjusted under 35 U.S.C. 154(b) by 1012 days.

(21) Appl. No.: 11/426,612

(22) Filed: Jun. 27, 2006

(65) Prior Publication Data

US 2007/0077020 A1 Apr. 5, 2007

(30) Foreign Application Priority Data

Sep. 21, 2005 (JP) ............................ 2005-274524

(51) Int. Cl.
*G06F 17/00* (2006.01)

(52) U.S. Cl. .......................................... 700/94; 381/27

(58) Field of Classification Search ................... 700/94; 386/96, 98, 99, 102; 381/2, 27, 306, 19, 381/20, 56, 77

See application file for complete search history.

(56) References Cited

U.S. PATENT DOCUMENTS 6,026,168 A * 2/2000 Li et al. ........................ 381/28
2001/0028723 A1* 10/2001 Yang et al. .................. 381/306
2003/0185400 A1* 10/2003 Yoshizawa et al. ............ 381/58
2004/0264717 A1* 12/2004 Fujita et al. ................. 381/307

FOREIGN PATENT DOCUMENTS

JP 05-244685 9/1993
JP 10-191203 7/1998
JP 2000-069379 3/2000
JP 2001-127571 5/2001
JP 2004-7389 1/2004

* cited by examiner

*Primary Examiner*—Walter F Briney, III
(74) *Attorney, Agent, or Firm*—Renner, Otto, Boisselle & Sklar, LLP

(57) ABSTRACT

A transmission signal processing device 10 includes a transmission signal data demultiplexing circuit RX for receiving multiplexed transmission signal data and demultiplexing the transmission signal data into video signal data and multi-channel audio signal data, a decoder circuit 100 for decoding the multi-channel audio signal data to obtain a plurality of multi-channel audio signal data including at least front center channel audio signal data, and a transmission signal data multiplexing circuit TX for multiplexing the video signal data and the front center channel audio signal data to obtain output transmission signal data.

18 Claims, 8 Drawing Sheets

TRANSMISSION SIGNAL PROCESSING DEVICE FOR VIDEO SIGNAL AND MULTI-CHANNEL AUDIO SIGNAL, AND VIDEO AND AUDIO REPRODUCING SYSTEM INCLUDING THE SAME

BACKGROUND OF THE INVENTION

1. Field of the Invention

The present invention relates to a transmission signal processing device for video signals and multi-channel audio signals, such as an AV amplifier, and also to a video and audio reproducing system in which a video device such as a display is added to the transmission signal processing device.

2. Description of the Related Art

A video and audio reproducing system including a display with a built-in speaker may be used to reproduce a content item containing a video image and a multi-channel audio, such as a movie. FIG. 8 shows a conventional video and audio reproducing system, including a display device 90, an AV amplifier 70, a front left speaker 3, a front right speaker 4, a surround left speaker 5, a surround right speaker 6, and a subwoofer 7. A video signal V and a volume-controlled, amplified front center audio signal C are supplied from the AV amplifier 70 to the display device 90 via an output terminal 72 and an output terminal 78, respectively. The display device 90 includes a display 91 connected to a video input terminal 92, and a left built-in speaker 93 and a right built-in speaker 94 connected to an audio input terminal 98 for reproducing a stereophonic sound. Therefore, in the conventional video and audio reproducing system, the front center audio signal (center signal) included in the multi-channel audio can be reproduced through the built-in speakers. In other words, the conventional video and audio reproducing system uses the built-in speakers of the display device as a substitute for a center speaker (not shown).

There are conventional television sets provided with a switch for switching between input signal terminals or speakers so as to allow the built-in display speaker to be used as a substitute for a center speaker for reproducing a front center audio signal (center signal) of a multi-channel audio. When reproducing a multi-channel audio, the built-in display speaker receives an amplified center signal from an external device such as an amplifier (Patent Document 1: Japanese Laid-Open Patent Publication No. 5-244685, Patent Document 2: Japanese Laid-Open Patent Publication No. 2000-69379).

There are conventional systems where video signals and audio signals are exchanged between the display and the AV amplifier by a transmission signal format such as HDMI (High-Definition Multimedia Interface) or IEEE1394 (i-Link) in which video signals and multi-channel audio signals are multiplexed together. Such a transmission signal format requires only one connection cable for connecting together the display and the AV amplifier of the video and audio reproducing system, via which video signals and multi-channel audio signals can be exchanged.

However, if the display and the AV amplifier are connected to each other by a transmission signal format such as HDMI or IEEE1394 in which video signals and multi-channel audio signals are multiplexed together, in a video and audio reproducing system as shown in FIG. 8 where a built-in display speaker is used as a substitute for a center speaker, it will be difficult to control the volume of the front center audio signal, rendering the system practically unusable. The overall volume level of the video and audio reproducing system, i.e., the master volume, is controlled by the AV amplifier, which decodes and amplifies the multi-channel audio signal and outputs the obtained signal to the speaker. However, the multi-channel audio signal multiplexed in a format such as HDMI or IEEE1394 is undecoded data whose volume is not controlled by the master volume, whereby it is not possible to control the volume of the front center audio signal.

SUMMARY OF THE INVENTION

An object of the present invention is to provide a video and audio reproducing system including a transmission signal processing device such as an AV amplifier for processing video signals and multi-channel audio signals, and an image device such as a display, wherein the transmission signal processing device is such that even if the display device and the AV amplifier are connected to each other by a transmission signal format such as HDMI or IEEE1394 in which video signals and multi-channel audio signals are multiplexed together, it is possible to use a built-in speaker of the display device as a substitute for a center speaker.

A transmission signal processing device of the present invention includes: a transmission signal data demultiplexing circuit for receiving transmission signal data in which a video signal and a multi-channel audio signal are multiplexed together and for demultiplexing the received transmission signal data into video signal data and multi-channel audio signal data; a decoder circuit for decoding the multi-channel audio signal data to output a plurality of multi-channel audio signal data including at least front center channel audio signal data; a transmission signal data multiplexing circuit for multiplexing together the video signal data and the front center channel audio signal data to obtain output transmission signal data; and a control circuit for controlling the transmission signal data demultiplexing circuit, the decoder circuit and the transmission signal data multiplexing circuit.

Preferably, the transmission signal processing device includes a volume adjustment circuit for adjusting a volume level of the multi-channel audio signal based on volume level control data output from the control circuit; the volume adjustment circuit includes a multiplier; and the multiplier multiplies each of the plurality of decoded multi-channel audio signal data by a coefficient determined based on the volume level control data to convert each multi-channel audio signal data to multi-channel audio signal data whose volume level has been adjusted.

Preferably, the volume adjustment circuit includes an attenuator for adjusting a volume level of a multi-channel audio output signal, which is obtained by converting each of the decoded multi-channel audio signal data into an analog signal, in a manner such that the volume level is linked with the coefficient determined based on the volume level control data.

Preferably, the transmission signal data multiplexing circuit multiplexes the video signal data with the front center channel audio signal data whose volume level has been adjusted to obtain output transmission signal data.

Preferably, the transmission signal data multiplexing circuit multiplexes the video signal data with the front center channel audio signal data on an input side of the multiplier to obtain output transmission signal data; and the transmission signal processing device further includes a volume level control data output circuit for outputting the volume level control data from the control circuit.

Preferably, the decoder circuit adds decoded low frequency channel audio signal data to the front center channel audio signal data; and the transmission signal data multiplexing circuit multiplexes the video signal data with the front center channel audio signal data, to which the low frequency channel audio signal data has been added, to obtain output transmission signal data.

Preferably, the decoder circuit adds decoded front left channel audio signal data and decoded front right channel audio signal data to the front center channel audio signal data; and the transmission signal data multiplexing circuit multiplexes the video signal data with the front center channel audio signal data, which is obtained by adding the front left channel audio signal data and the front right channel audio signal data, to obtain output transmission signal data.

Preferably, the front center channel audio signal data input from the decoder circuit to the transmission signal data multiplexing circuit is stereophonic PCM (Pulse Code Modulation) data, in which a PCM left channel signal and a PCM right channel signal contain the front center channel audio signal data at an equal level.

Preferably, the decoder circuit outputs low frequency channel audio signal data; and the transmission signal data multiplexing circuit multiplexes together the video signal data, the front center channel audio signal data and the low frequency channel audio signal data to obtain output transmission signal data.

Preferably, the decoder circuit outputs front left channel audio signal data and front right channel audio signal data; and the transmission signal data multiplexing circuit multiplexes together the video signal data, the front center channel audio signal data, the front left channel audio signal data and the front right channel audio signal data to obtain output transmission signal data.

Preferably, the transmission signal data to be transmitted in a multiplexed form is multi-channel PCM data including at least front center channel audio signal data.

A video and audio reproducing system of the present invention includes: one of the transmission signal processing devices as set forth above; a transmission signal demultiplexing circuit for receiving the output transmission signal data from the transmission signal processing device and demultiplexing the output transmission signal data into a video signal and front channel audio signal data; and a display device, the display device including a display for displaying the video signal, a D/A converter for converting the front center channel audio signal data to a front center channel audio signal, at least one channel of an amplifier and a speaker for reproducing the front center channel audio signal.

Preferably, the display device includes two channels of amplifiers and speakers for reproducing the front center channel audio signal.

Preferably, the display device includes an amplifier and a speaker for reproducing the low frequency channel audio signal.

Preferably, the display device receives the volume level control data and controls a gain of an amplifier for reproducing the front center channel audio signal and the low frequency channel audio signal.

A video and audio reproducing system of the present invention includes: a transmission signal processing device such as an AV amplifier; and a display device, the display device including at least one channel of an amplifier and a speaker for reproducing a front center channel audio signal. The transmission signal processing device includes: a transmission signal data demultiplexing circuit for a transmission signal of a format such as HDMI or IEEE1394; a decoder circuit for decoding multi-channel audio signal data; a transmission signal data multiplexing circuit; and a control circuit for controlling these circuits. The display device further includes: a transmission signal demultiplexing circuit for receiving the output transmission signal data from the transmission signal processing device and demultiplexing the output transmission signal data into a video signal and front channel audio signal data; a display for displaying the video signal; and a D/A converter for converting the front center channel audio signal data to a front center channel audio signal. The display device may include two channels of amplifiers and speakers for reproducing the front center channel audio signal. Therefore, with the transmission signal processing device of the present invention, it is possible to realize a video and audio reproducing system in which a built-in speaker of the display device can be used as a center speaker.

The transmission signal data demultiplexing circuit of the transmission signal processing device receives transmission signal data in which a video signal and a multi-channel audio signal are multiplexed together, and demultiplexes the received transmission signal data into video signal data and multi-channel audio signal data. The decoder circuit decodes the multi-channel audio signal data to output a plurality of multi-channel audio signal data including at least front center channel audio signal data. The transmission signal data multiplexing circuit multiplexes together the video signal data and the front center channel audio signal data to obtain output transmission signal data. Therefore, even if the display device and the transmission signal processing device are connected to each other by a transmission signal format such as HDMI or IEEE1394 in which video signals and multi-channel audio signals are multiplexed together, it is possible to use a built-in speaker of the display device as a substitute for a center speaker for reproducing the front center channel audio signal.

The transmission signal processing device includes a volume adjustment circuit for adjusting a volume level of the multi-channel audio signal based on volume level control data output from the control circuit. The volume adjustment circuit includes a multiplier, and the multiplier multiplies each of the plurality of decoded multi-channel audio signal data by a coefficient determined based on the volume level control data to convert each multi-channel audio signal data to multi-channel audio signal data whose volume level has been adjusted. The transmission signal data multiplexing circuit multiplexes the video signal data with the front center channel audio signal data whose volume level has been adjusted to obtain output transmission signal data. The volume adjustment circuit includes an attenuator for adjusting a volume level of a multi-channel audio output signal, which is obtained by converting each of the decoded multi-channel audio signal data into an analog signal, in a manner such that the volume level is linked with the coefficient determined based on the volume level control data. Therefore, since the front channel audio signal data whose volume has been controlled by the master volume of the volume adjustment circuit is multiplexed with the video signal and transmitted to the display device, it is possible to use the built-in speakers of the display device as a substitute for a center speaker for reproducing the front channel audio signal while controlling the volume of the front channel audio signal. Also for the audio signals of other channels, other than the front center channel audio signal, the volume level can be adjusted in such a manner that the volume level is linked with the coefficient based on the volume level control data.

In one embodiment, the transmission signal data multiplexing circuit multiplexes the video signal data with the front center channel audio signal data on an input side of the multiplier to obtain output transmission signal data; and the transmission signal processing device further includes a volume level control data output circuit for outputting the volume level control data from the control circuit. Then, since the volume level control data can be independently transmitted to the display device, it is easier for the display device to control the amplifier, whereby the volume can be controlled by the master volume of the video and audio reproducing system.

In one embodiment, the front center channel audio signal data input from the decoder circuit to the transmission signal data multiplexing circuit is stereophonic PCM (Pulse Code Modulation) data, in which a PCM left channel signal and a PCM right channel signal contain the front center channel audio signal data at an equal level. In one embodiment, the transmission signal data to be transmitted in a multiplexed form is multi-channel PCM data including at least front center channel audio signal data. Then, even if the display device and the transmission signal processing device are connected to each other by a transmission signal format such as HDMI or IEEE1394, it is possible to use a built-in speaker of the display device as a substitute for a center speaker for reproducing the front center channel audio signal.

In one embodiment, where the display device includes an amplifier and a speaker for reproducing a low frequency channel audio signal, the decoder circuit of the transmission signal processing device adds decoded low frequency channel audio signal data to decoded front center channel audio signal data; and the transmission signal data multiplexing circuit multiplexes the video signal data with the front center channel audio signal data, to which the low frequency channel audio signal data has been added, to obtain output transmission signal data. In one embodiment, the decoder circuit of the transmission signal processing device outputs low frequency channel audio signal data, obtained by decoding a low frequency channel audio signal, and the transmission signal data multiplexing circuit multiplexes together the video signal data, the front center channel audio signal data and the low frequency channel audio signal data to obtain output transmission signal data. Then, the subwoofer of the display device can be used as a subwoofer for reproducing the low frequency channel audio signal of the video and audio reproducing system.

In one embodiment, the display device includes an amplifier and a speaker for reproducing a front center channel audio signal, and the decoder circuit of the transmission signal processing device adds decoded front left channel audio signal data and decoded front right channel audio signal data to the front center channel audio signal data; and the transmission signal data multiplexing circuit multiplexes the obtained data with the video signal data to obtain output transmission signal data. In one embodiment, the decoder circuit outputs front left channel audio signal data and front right channel audio signal data; and the transmission signal data multiplexing circuit multiplexes together the video signal data, the front center channel audio signal data, the front left channel audio signal data and the front right channel audio signal data to obtain output transmission signal data. Since it is possible to transmit the front left channel audio signal and the front right channel audio signal, which are often highly correlative with the front center channel audio signal, to the display device by a transmission signal format such as HDMI or IEEE1394, it is possible to reproduce, from the built-in speakers of the display device, a sound image that should be established in front of the user.

DETAILED DESCRIPTION OF THE PREFERRED EMBODIMENTS

Preferred embodiments of the present invention will now be described in detail with reference to the drawings. Note that the present invention is not limited to the preferred embodiments set forth below.

Figure 1:
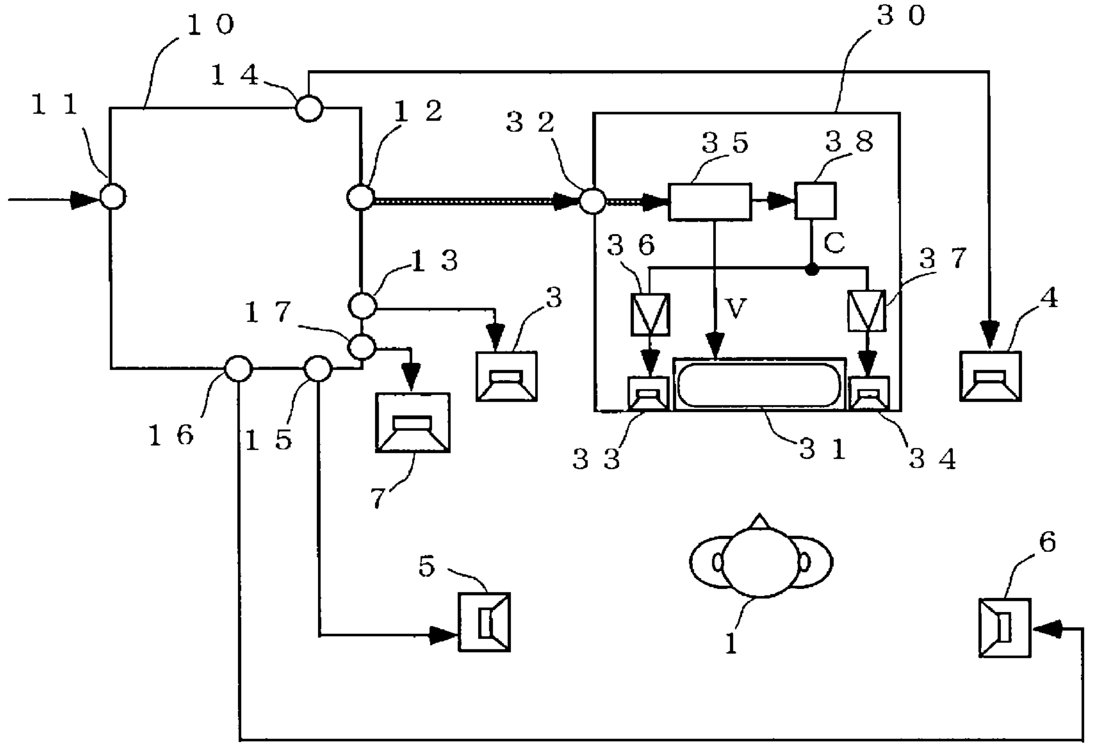
FIG. 1 shows a video and audio reproducing system (Example 1).

FIG. 1 shows a video and audio reproducing system according to a preferred embodiment of the present invention. The video and audio reproducing system includes an AV amplifier 10, a display device 30 and a plurality of speakers around a user 1. The AV amplifier 10 and the display device 30 are connected to each other by an HDMI transmission signal format in which at least video signals and multi-channel audio signals are multiplexed together. Since the display device 30 of the video and audio reproducing system includes a left built-in speaker 33 and a right built-in speaker 34, the front center audio signal (center signal) included in the multi-channel audio can be acoustically reproduced through these built-in speakers. The plurality of speakers include a front left speaker 3, a front right speaker 4, a surround left speaker 5, a surround right speaker 6 and a subwoofer 7 for reproducing a low frequency channel signal (or a low frequency channel component) of a multi-channel audio. These speakers 3 to 7 are connected to amplifier circuits provided in the AV amplifier 10 for the respective channels by speaker connection lines via output terminals 13 to 17, respectively.

An HDMI input terminal 11 of the AV amplifier 10 receives, from a DVD player (not shown), an HDMI signal in which a video signal and a multi-channel audio signal are multiplexed together. The HDMI multi-channel audio signal supplied to the input terminal 11 of the AV amplifier 10 is multi-channel audio signal data obtained by encoding together a front center audio signal C, a front left audio signal L, a front right audio signal R, a surround left audio signal SL, a surround right audio signal SR and a low frequency channel audio signal SW. An HDMI output terminal 12 of the AV amplifier 10 is connected to an HDMI input terminal 32 of the display device 30. Thus, the AV amplifier 10 connects together the DVD player (not shown) and the display device 30 by an HDMI signal transmission format.

Figure 2:
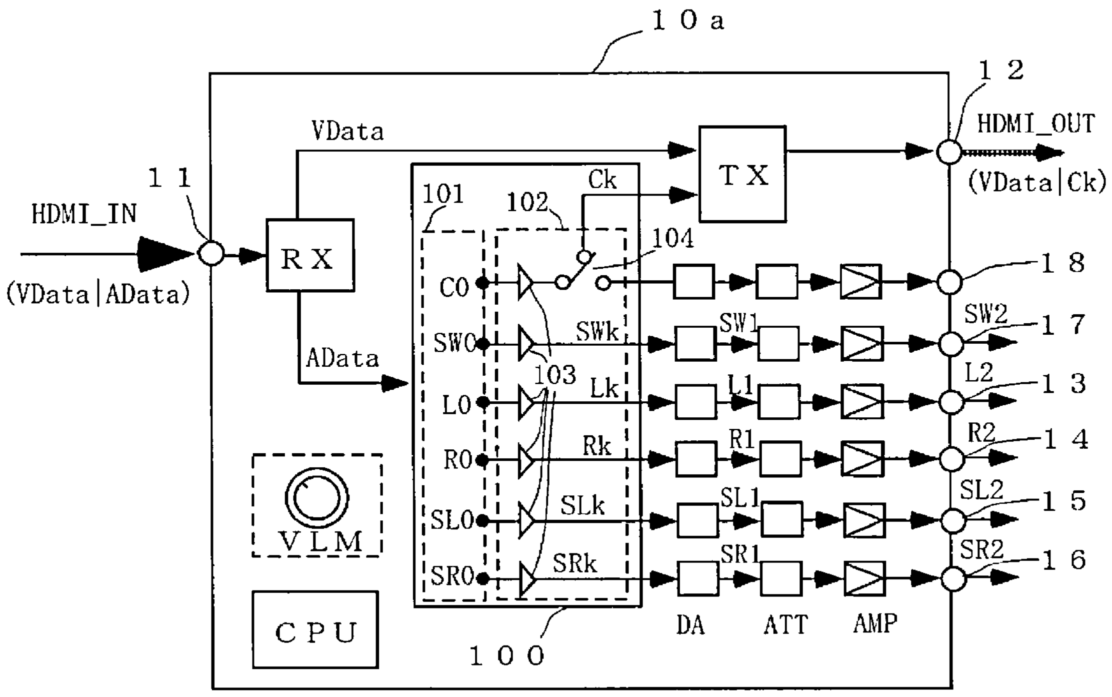
FIG. 2 schematically shows an AV amplifier 10*a* according to a first example (Example 1).

FIG. 2 schematically shows an AV amplifier 10*a* according to a first example. The AV amplifier 10*a* includes a transmission signal data demultiplexing circuit RX connected to the HDMI input terminal 11, and a transmission signal data multiplexing circuit TX connected to the HDMI output terminal 12. The AV amplifier 10*a* also includes a decoder circuit 100 connected to the transmission signal data demultiplexing circuit RX, D/A converters DA for converting multi-channel audio output signal data from the decoder circuit 100 into analog signals, attenuators ATT for adjusting the levels of the analog multi-channel audio output signals, amplifiers AMP for amplifying the multi-channel audio output signals, and output terminals 13 to 18. The AV amplifier 10*a* also includes a control circuit CPU for controlling the transmission signal data demultiplexing circuit RX, the decoder circuit 100 and the transmission signal data multiplexing circuit TX, and a volume circuit VLM. For the sake of simplicity, the figure does not show the control lines between the control circuit CPU and various portions of the AV amplifier 10*a* and other components (e.g., the power supply, indicators, etc.) that do not need to be shown for the purpose of describing the present invention herein.

The transmission signal data demultiplexing circuit RX receives and demultiplexes transmission signal data HDMI_IN in which a video signal and a multi-channel audio signal are multiplexed together to obtain video signal data VData and multi-channel audio signal data AData, which are output to the transmission signal data multiplexing circuit TX and the decoder circuit 100, respectively. The multi-channel audio signal data AData is decoded, through a decoding section 101 of the decoder circuit 100, into a front center channel audio signal data C0, a low frequency channel audio signal data SW0, a front left channel audio signal data L0, a front right channel audio signal data R0, a surround left channel audio signal data SL0, and a surround right channel audio signal data SR0. Note that the multi-channel audio signal data AData is not limited to so-called "5.1-channel" audio data, but may alternatively be 7.1-channel audio data, which further includes a rear surround left channel audio signal data SBL0 and a rear surround right channel audio signal data SBR0.

The output audio signal data C0, SW0, L0, R0, SL0 and SR0 of the decoding section 101 of the decoder circuit 100 are "full-scale" PCM (Pulse Code Modulation) audio signal data obtained by direction conversion of the multi-channel audio signal data AData, and the volume levels thereof are adjusted through a volume adjustment circuit 102 before being acoustically reproduced. Thus, the decoder circuit 100 of the AV amplifier 10 includes the volume adjustment circuit 102 for adjusting the volume level of the multi-channel audio signal based on volume level control data Gk output from the control circuit CPU. For example, the volume circuit VLM with a rotary encoder includes a master volume for all the channels of the multi-channel audio, and the volume information set by the volume circuit VLM is sent to the control circuit CPU, based on which the control circuit CPU produces the volume level control data Gk. Specifically, the volume adjustment circuit 102 includes multipliers 103 for multiplying the output audio signal data C0, SW0, L0, R0, SL0 and SR0 decoded through the decoding section 101 each by a coefficient k ($0 \leqq k \leqq 1$) based on the volume level control data Gk, thereby yielding the output audio signal data Ck, SWk, Lk, Rk, SLk and SRk whose volume levels have been adjusted. The volume adjustment circuit 102 may be either included in the decoder circuit 100 or may be a separate circuit from the decoder circuit 100. Specifically, the attenuators ATT may operate in such a manner that the operation is linked with the coefficient k based on the volume level control data Gk.

Among the output audio signal data Ck, Lk, Rk, SLk, SRk and SWk whose volume level has been adjusted, the data Lk, Rk, SLk, SRk and SWk (excluding Ck, which is based on the front center channel audio signal), which are PCM audio signal data, are converted through the D/A converters DA into analog signals L1, R1, SL1, SR1 and SW1. The analog signals L1, R1, SL1, SR1 and SW1 are amplified through the attenuators ATT and the amplifiers AMP, and are supplied to the output terminals 13 to 17 as speaker output signals L2, R2, SL2, SR2 and SW2. It is assumed herein that each attenuator ATT is a "through" attenuator (the attenuation being 0 dB). The output terminals 13 to 17 are connected to the speakers 3 to 7, respectively. Specifically, the output terminals 13 to 17 are connected to the front left speaker 3, the front right speaker 4, the surround left speaker 5, the surround right speaker 6, and the subwoofer 7 for reproducing a low frequency channel signal (or a low frequency channel component) of a multi-channel audio, respectively. Therefore, the audio signals of various channels, excluding the front center channel audio signal C, are acoustically reproduced through the plurality of speakers around the user 1.

The output audio signal data Ck whose volume level has been adjusted based on the front center channel audio signal is output from the decoder circuit 100 through a switch circuit 104 to the transmission signal data multiplexing circuit TX in the form of monophonic PCM audio signal data. The transmission signal data multiplexing circuit TX is also receiving the video signal data VData from the transmission signal data demultiplexing circuit RX. Thus, the transmission signal data multiplexing circuit TX multiplexes the video signal data VData with the front channel audio signal data Ck whose volume level has been adjusted to obtain output transmission signal data HDMI_OUT (VData|Ck), which can then be output to the display device 30 via the HDMI output terminal 12.

The HDMI signal HDMI_OUT supplied to the HDMI input terminal 32 of the display device 30 is demultiplexed into the video signal data VData and the front channel audio signal data Ck through an HDMI demultiplexing circuit 35 connected to the HDMI input terminal 32. The video signal data VData is converted to a video signal V, which is rendered on a display 31. The front channel audio signal data Ck, being monophonic PCM audio signal data, is converted to an analog signal C through a D/A converter 38. The analog signal C is amplified through amplifiers 36 and 37, and the amplified signals are acoustically reproduced through the left built-in speaker 33 and the right built-in speaker 34, respectively. Thus, the display device 30 receiving the output transmission signal data HDMI_OUT can render the video signal V on the display 31 while acoustically reproducing the front channel audio signal whose volume level has been adjusted through the left built-in speaker 33 and the right built-in speaker 34.

Therefore, even if the AV amplifier 10 and the display device 30 are connected to each other by a transmission signal format in which multi-channel audio signals are multiplexed together, the left built-in speaker 33 and the right built-in speaker 34 provided in the display device 30 can be used as a center speaker, thus providing a multi-channel sound field to the user 1. By using the left built-in speaker 33 and the right built-in speaker 34 provided in the display device 30 as a center speaker, it is possible to obtain a multi-channel sound field in which the video image and the sound image of the front audio signal are well aligned with each other. Moreover, since the front channel audio signal data whose volume has been controlled by the master volume of the volume adjustment circuit is multiplexed with the video signal and transmitted to the display device, it is possible to use the built-in speakers of the display device as a substitute for a center speaker for reproducing the front channel audio signal while controlling the volume of the front channel audio signal in such a manner that the volume is linked with the master volume.

It is preferred that each attenuator ATT is a "through" attenuator (the attenuation being 0 dB) as described above in cases where the D/A converters DA and the amplifiers AMP of the AV amplifier 10 are "digital" amplifiers. However, where the amplifiers AMP are "analog" amplifiers, it is preferred to control the volume by using these attenuators (ATT). Multiplying a digital signal by a coefficient smaller than 1 with a multiplier results in loss of a lower bit, thereby deteriorating the precision. With this method, however, it is possible to avoid the deterioration of precision in the output of the AV amplifier 10. Then, the coefficient of 1 is used for the multipliers 103 for channels other than the front channel audio signal data Ck whose volume level has been adjusted and which is sent to the transmission signal data multiplexing circuit TX (i.e., SWk, Lk, Rk, SLk and SRk), and a control signal including the coefficient k based on the volume level control data Gk is sent from the control circuit CPU to each attenuator ATT provided between a D/A converter DA and an amplifier AMP. Since the coefficient k included in the control signal for the attenuator ATT and the coefficient k for the multiplier 103 for the front channel audio signal data C0 are linked with each other, the output volume of the AV amplifier 10 and that of the display 31 can be linked with each other.

Figure 3:
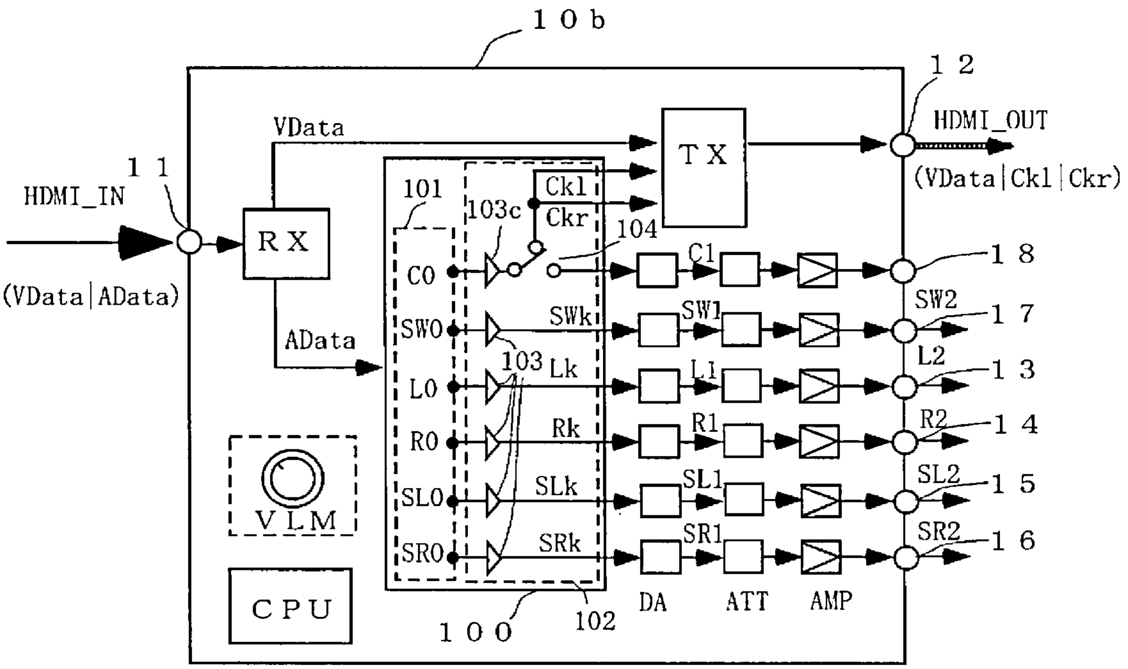
FIG. 3 schematically shows an AV amplifier 10*b* according to a second example (Example 2).

FIG. 3 schematically shows an AV amplifier 10*b* according to a second example. The AV amplifier 10*b* of the second example differs from the AV amplifier 10*a* of the first example in that the output audio signal data Ck supplied to the transmission signal data multiplexing circuit TX whose volume level has been adjusted based on the front center channel audio signal is output from the decoder circuit 100 in the form of stereophonic PCM audio signal data. The PCM left channel signal and the PCM right channel signal may each contain the front center channel audio signal data at an equal level. Thus, the output audio signal data Ck whose volume level has been adjusted based on the front center channel audio signal is converted to a stereophonic PCM signal including two separated channels of monophonic signals Ck1 and Ckr. The stereophonic PCM audio signal data is output from the decoder circuit 100 through the switch circuit 104 to the transmission signal data multiplexing circuit TX, which multiplexes the video signal data VData with the front center channel audio signal data Ck1 and Ckr whose volume levels have been adjusted to obtain the output transmission signal data HDMI_OUT (VData|Ck1|Ckr), which can then be output to the display device 30 via the HDMI output terminal 12.

The HDMI signal HDMI_OUT supplied to the HDMI input terminal 32 of the display device 30 is demultiplexed into the video signal V and the front center channel audio signal data Ck1 and Ckr through the HDMI demultiplexing circuit 35 connected to the HDMI input terminal 32. The video signal V is rendered on the display 31. The front channel audio signal data Ck1 and Ckr, being stereophonic PCM audio signal data, are converted to analog signals C1 and Cr through the D/A converter 38. The analog signals C1 and Cr are amplified through the amplifiers 36 and 37, and the amplified signals are acoustically reproduced through the left built-in speaker 33 and the right built-in speaker 34, respectively. Thus, the display device 30 receiving the output transmission signal data HDMI_OUT can render the video signal V on the display 31 while acoustically reproducing the front channel audio signal whose volume level has been adjusted through the left built-in speaker 33 and the right built-in speaker 34.

If a monophonic front center channel audio signal is supplied to each of the left built-in speaker 33 and the right built-in speaker 34 of the display device 30, being used as a center speaker, the audio output from the left built-in speaker 33 and that from the right built-in speaker 34 are combined together at the position of the user 1, and therefore the user 1 will assumedly receive the sound at a level about 3 dB higher than otherwise. Therefore, in the volume adjustment circuit 102 of the AV amplifier 10, if the signals Lk, Rk, SLk, SRk and SWk (excluding Ck) are multiplied by the coefficient k based on the volume level control data Gk ($0 \leqq k \leqq 1$) through the multipliers 103, the signal Ck may be multiplied by a coefficient $k/(\sqrt{2})$ through a multiplier 103*c* to lower the level of Ck by about 3 dB. If the gain of the amplifiers AMP of the AV amplifier 10 and the efficiency of the speakers 3 to 7 differ from the gain of the amplifiers AMP of the display device 30 and the efficiency of the left built-in speaker 33 and the right built-in speaker 34, the level of the front center channel audio signal may be adjusted by the multiplier 103*c* to those of the audio signals of the other channels.

Figure 4:
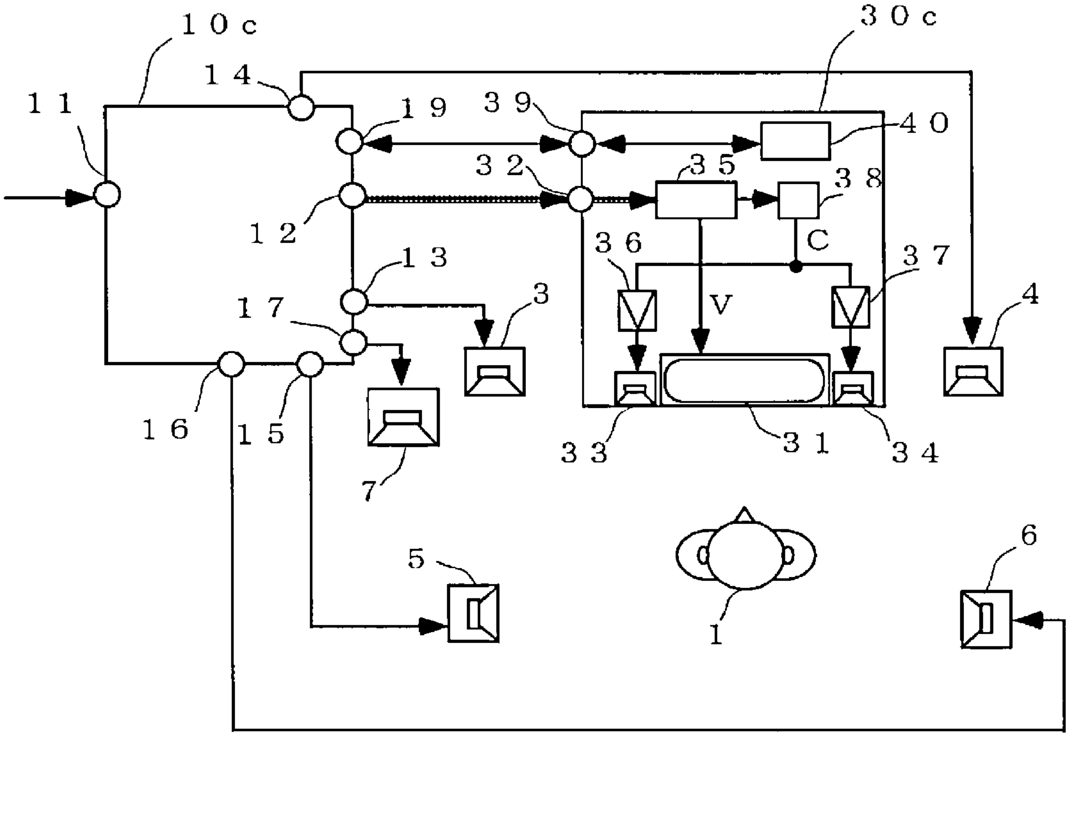
FIG. 4 shows another video and audio reproducing system (Example 3).

FIG. 4 shows a video and audio reproducing system according to another preferred embodiment of the present invention. The video and audio reproducing system includes an AV amplifier 10*c* and a display device 30*c*, which are connected to each other by an HDMI transmission signal format, and a plurality of speakers around the user 1. In this video and audio reproducing system, the AV amplifier 10*c* further includes a volume level control data output circuit for outputting, through an output terminal 19, the volume level control data Gk from the control circuit CPU, and the display device 30*c* further includes a control data input terminal 39 connected to a control circuit 40. The display device 30*c* is similar to the display device 30 of the first example in that it includes the left built-in speaker 33 and the right built-in speaker 34. What has already been described in the examples above will not be further described below.

Figure 5:
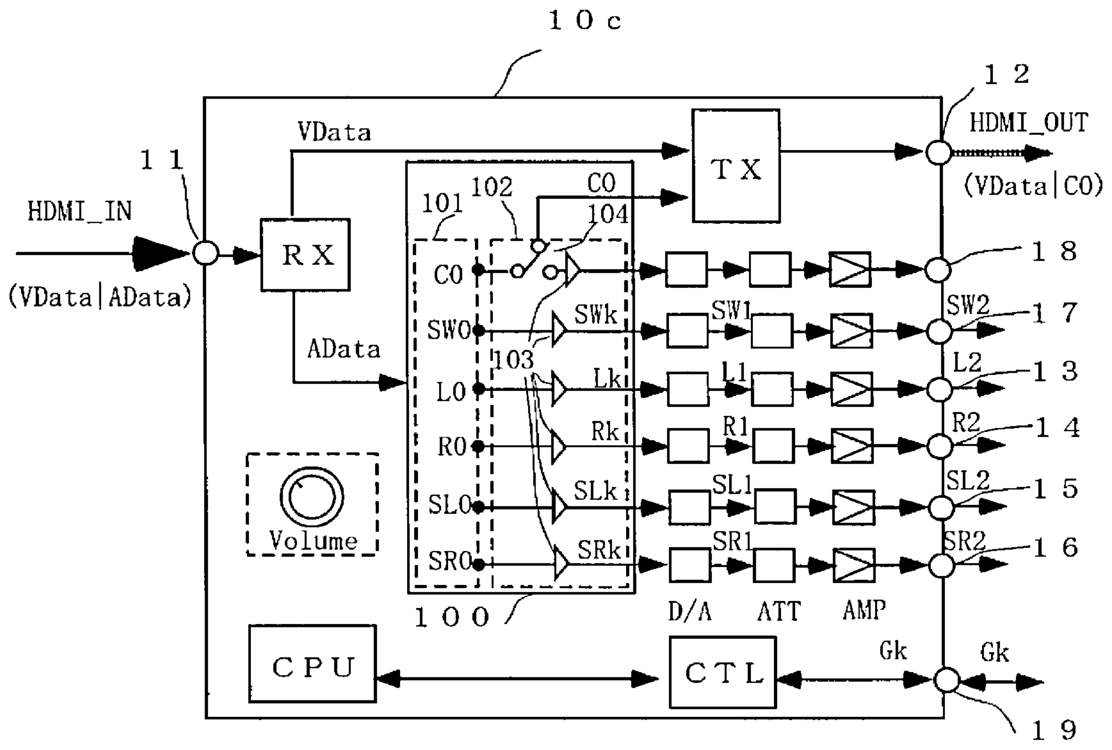
FIG. 5 schematically shows an AV amplifier 10*c* according to a third example (Example 3).

FIG. 5 schematically shows the AV amplifier 10*c* of a third example used in the video and audio reproducing system of FIG. 4. The AV amplifier 10*c* of the third example differs from the AV amplifiers of the first and second examples in that the AV amplifier 10*c* further includes a volume level control data output circuit CTL for outputting, through the output terminal 19, the volume level control data Gk from the control circuit CPU, and in that what is supplied to the transmission signal data multiplexing circuit TX is the decoded front center channel audio signal data, i.e., the front center channel audio signal data C0 on the input side of the multiplier. Thus, the decoded, full-scale front center channel audio signal data C0 is sent to the display device 30*c*, but not the output audio signal data Ck whose volume level has been adjusted by the volume adjustment circuit 102 of the decoder circuit 100. The transmission signal data multiplexing circuit TX of the AV amplifier 10*c* multiplies the video signal data VData with the front center channel audio signal data C0 on the input side of the multiplier to produce and output the output transmission signal data HDMI_OUT (VData|C0).

The volume level control data output circuit CTL outputs the volume level control data Gk from the control circuit CPU to the control data input terminal 39 of the display device 30*c* through the terminal 19. The connection between the terminal 19 and the control data input terminal 39 may be any type of connection as long as the volume level control data Gk can be sent over the connection, e.g., a connection via a control line carrying remote control signals for the AV amplifier and the display device, an HDMI CEC connection, an IEEE1394 Vender Unique connection, etc. Since the volume level control data Gk can be independently transmitted to the display device 30*c*, the control circuit 40 of the display device 30*c* controls the amplification gains of the amplifiers 36 and 37. The volume adjustment of the AV amplifier 10*c* may be done by the volume adjustment circuit 102 or by the attenuator ATT provided between the D/A converter DA and the amplifier AMP, and can be linked with the volume adjustment of the display device 30*c*. As a result, the decoded front center channel audio signal can be reproduced at the same volume level as the other multi-channel audio signals, and the volume can be controlled by the master volume. With this video and audio reproducing system, the front center audio signal contained in the multi-channel audio is transmitted in full scale, whereby it is possible to obtain multi-channel sound field reproduction with desirable S/N. In the present example, if the volume adjustment of the AV amplifier 10*c* is done by the attenuator ATT, the coefficient of 1 can be used for all the multipliers 103 of the volume adjustment circuit 102, thereby avoiding loss of a lower bit and a precision deterioration associated therewith for all of the multi-channel audio signals. Thus, for any of the outputs of the system, the precision does not deteriorate.

Figure 6:
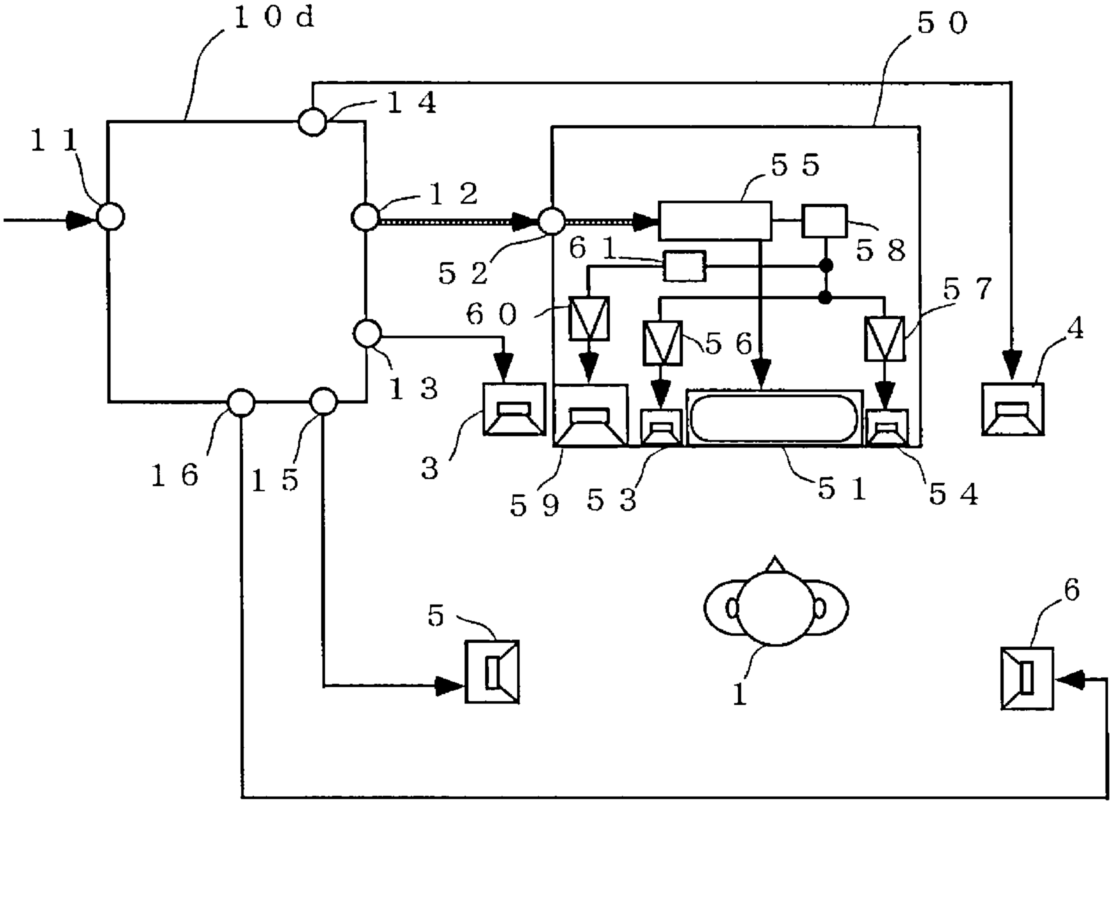
FIG. 6 shows still another video and audio reproducing system (Example 4).

FIG. 6 shows a video and audio reproducing system according to another preferred embodiment of the present invention. The video and audio reproducing system includes an AV amplifier 10*d* and a display device 50, which are connected to each other by an HDMI transmission signal format, and a plurality of speakers around the user 1. The display device 50 includes a left built-in speaker 53, a right built-in speaker 54 and also a subwoofer 59. Therefore, in this video and audio reproducing system, the front center audio signal contained in the multi-channel audio is acoustically reproduced from these built-in speakers and a low frequency channel signal (or a low frequency channel component) of the multi-channel audio is acoustically reproduced from the built-in subwoofer 59 of the display device 50. What has already been described in the examples above will not be further described below.

Figure 7:
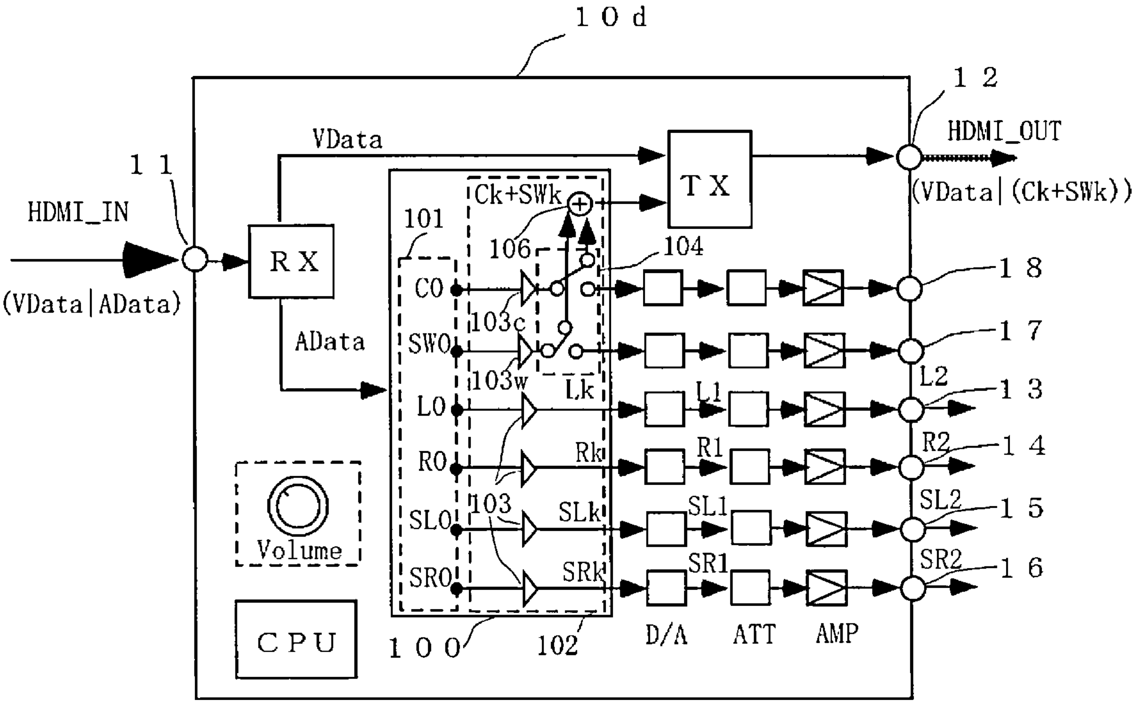
FIG. 7 schematically shows an AV amplifier 10*d* according to a fourth example (Example 4).
Figure 8:
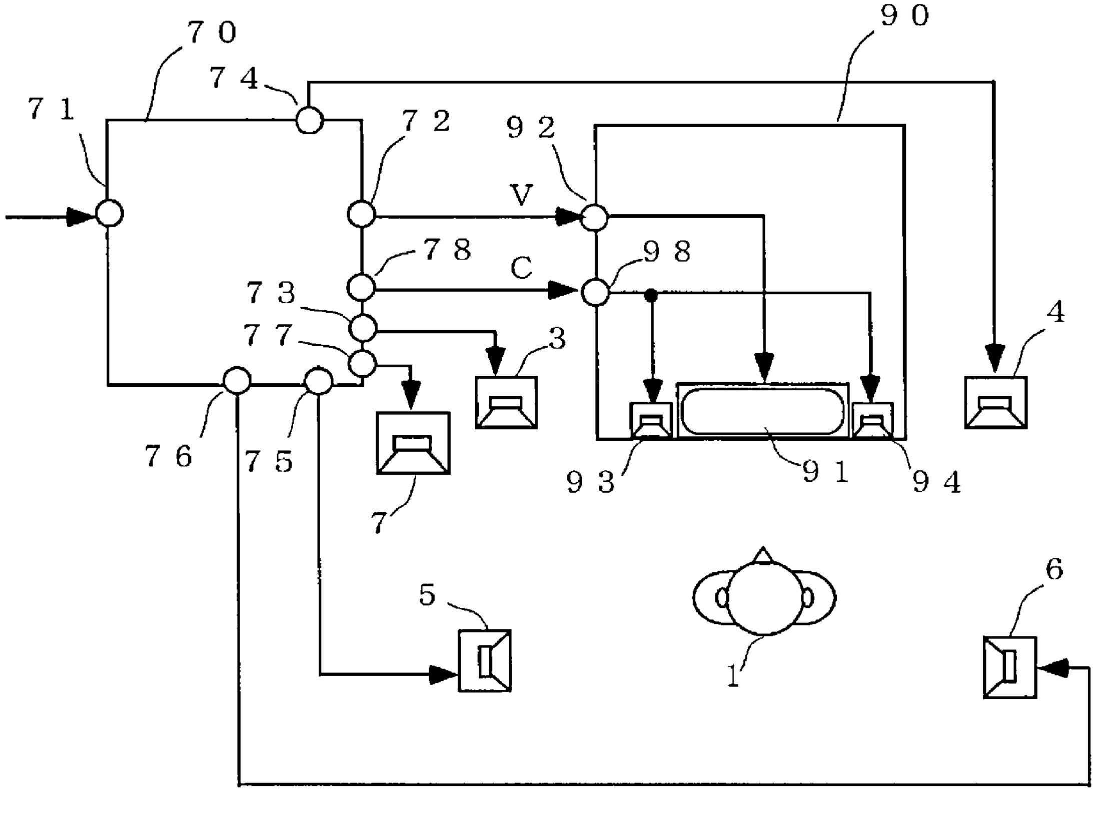
FIG. 8 shows a conventional video and audio reproducing system.

FIG. 7 schematically shows the AV amplifier 10*d* of a fourth example used in the video and audio reproducing system of FIG. 6. The AV amplifier 10*d* of the fourth example differs from the AV amplifiers of the above examples in that the volume adjustment circuit 102 of the decoder circuit 100 includes an adder circuit 106 for adding together the output audio signal data Ck and SWk whose volume levels have been adjusted, and supplying the audio signal data (Ck+SWk) to the transmission signal data multiplexing circuit TX. The front center audio signal data C0 and the low frequency channel audio signal data SW0 are multiplied through multipliers 103*c* and 103*w*, respectively, by the coefficient k ($0 \leqq k \leqq 1$) based on the volume level control data Gk to obtain the output audio signal data Ck and SWk whose volume levels have been adjusted, after which the audio signal data Ck and SWk are added together by the adder circuit 106. As the switch circuit 104 supplies the audio signal data (Ck+SWk) to the transmission signal data multiplexing circuit TX, the transmission signal data multiplexing circuit TX multiplies the video signal data VData with the audio signal data (Ck+SWk) whose volume level has been adjusted to obtain the output transmission signal data HDMI_OUT (VData|(Ck+SWk)), which is output to the display device 50 via the HDMI output terminal 12.

A transmission signal demultiplexing circuit 55 of the display device 50 demultiplexes the audio signal data (Ck+SWk) whose volume level has been adjusted from the output transmission signal data HDMI_OUT, and inputs the demultiplexed data to a D/A converter 58. The converted analog signal output from the D/A converter 58 is input to an LPF (low-pass filter) 61 so as to supply only the low-frequency component to an amplifier 60. Then, the low frequency channel signal amplified through the amplifier 60 is reproduced from the built-in subwoofer 59. Therefore, even if the AV amplifier 10*d* and the display device 50 are connected to each other by a transmission signal format in which multi-channel audio signals are multiplexed together, the left built-in speaker 53 and the right built-in speaker 54 of the display device 50 can be used as a substitute for a center speaker while the subwoofer 59 of the display device 50 can be used as a substitute for a subwoofer for reproducing the low frequency channel audio signal of the video and audio reproducing system.

Where the transmission signal demultiplexing circuit 55 of the display device 50 is capable of demultiplexing and outputting the low frequency channel audio signal data SWk, the transmission signal data multiplexing circuit TX of the AV amplifier 10*c* may multiplex the video signal data VData, the front channel audio signal data Ck and the low frequency channel audio signal data SWk obtained by decoding the low frequency channel audio signal to obtain the output transmission signal data (VData|Ck|SWk). The subwoofer 59 of the display device 50 may be used as a subwoofer for reproducing the low frequency channel audio signal of the video and audio reproducing system. The transmission signal data to be transmitted in a multiplexed form may be multi-channel PCM data including at least one front center channel audio signal data. Therefore, even if the display device and the transmission signal processing device are connected to each other by a transmission signal format such as HDMI or IEEE1394, the built-in speakers of the display device as a substitute for a center speaker for reproducing the front center channel audio signal.

The present invention is not limited to the above examples. For example, the AV amplifier and the display device of the video and audio reproducing system may be changed as follows. For example, the decoder circuit of the AV amplifier may add the decoded front left channel audio signal data and the decoded front right channel audio signal data to the front center channel audio signal data to output the obtained data, which may be multiplexed with the video signal data by the transmission signal data multiplexing circuit to obtain the output transmission signal data. Since the display device includes an amplifier and speakers for reproducing the front center channel audio signal, it is possible to transmit the front left channel audio signal and the front right channel audio signal, which are often highly correlative with the front center channel audio signal, to the display device by a transmission signal format such as HDMI or IEEE1394, so as to reproduce, from the built-in speakers of the display device, a sound image that should be established in front of the user.

If the signal transmission format between the AV amplifier and the display device is one where multi-channel PCM audio signals can be transmitted, such as IEEE1394, the decoder circuit of the AV amplifier may multiplex together the video signal data, the front center channel audio signal data, the front left channel audio signal data and the front right channel audio signal data to obtain output transmission signal data. It is understood that the transmission signal format is not limited to HDMI, IEEE1394, and the like, but may be any type of a transmission signal format in which video signals and multi-channel audio signals can be multiplexed together.

The transmission signal processing device of the present invention can be applied not only to AV amplifiers with amplifiers therein for reproducing multi-channel audio, but may also be applied to control amplifiers without amplifiers therein.

What is claimed is:

1. A transmission signal processing device, comprising:

a transmission signal data demultiplexing circuit for receiving transmission signal data in which a video signal and a multi-channel audio signal are multiplexed together and for demultiplexing the received transmission signal data into video signal data and multi-channel audio signal data;

a decoder circuit for decoding the multi-channel audio signal data to output a plurality of multi-channel audio signal data including at least front center channel audio signal data and low frequency channel audio signal data;

a transmission signal data multiplexing circuit for multiplexing together the video signal data and the front center channel audio signal data to obtain output transmission signal data;

a control circuit for controlling the transmission signal data demultiplexing circuit, the decoder circuit and the transmission signal data multiplexing circuit;

a volume level control data output circuit for outputting a volume level control data from the control circuit; and a volume adjustment circuit for adjusting a volume level of the multi-channel audio signal based on volume level control data output from the control circuit, the volume adjustment circuit including a multiplier that multiplies each of the plurality of decoded multi-channel audio signal data by a coefficient determined based on the volume level control data to convert each multi-channel audio signal data to multi-channel audio signal data whose volume level has been adjusted, and an attenuator for adjusting a volume level of a multi-channel audio output signal, which is obtained by converting each of the decoded multi-channel audio signal data into an analog signal, in a manner such that the volume level is linked with the coefficient determined based on the volume level control data;

wherein the transmission signal data multiplexing circuit at least one of:

multiplexes the video signal data with the front center channel audio signal data, to which the low frequency channel audio signal data has been added, to obtain the output transmission signal data, where the volume level of the front center channel audio signal data has been adjusted, and multiplexes the video signal data with the front center channel audio signal data on an input side of the multiplier of the volume adjustment circuit to obtain the output transmission signal data, in which case the volume level control data is output by the volume level control data output circuit.

2. The transmission signal processing device according to claim 1, wherein:

the decoder circuit adds decoded front left channel audio signal data and decoded front right channel audio signal data to the front center channel audio signal data; and the transmission signal data multiplexing circuit multiplexes the video signal data with the front center channel audio signal data, which is obtained by adding the front left channel audio signal data and the front right channel audio signal data, to obtain output transmission signal data.

3. The transmission signal processing device according to claim 1, wherein the front center channel audio signal data input from the decoder circuit to the transmission signal data multiplexing circuit is stereophonic PCM (Pulse Code Modulation) data, in which a PCM left channel signal and a PCM right channel signal contain the front center channel audio signal data at an equal level.

4. The transmission signal processing device according to claim 1, wherein:

the decoder circuit outputs front left channel audio signal data and front right channel audio signal data; and the transmission signal data multiplexing circuit multiplexes together the video signal data, the front center channel audio signal data, the front left channel audio signal data and the front right channel audio signal data to obtain output transmission signal data.

5. The transmission signal processing device according to claim 4, wherein the transmission signal data to be transmitted in a multiplexed form is multi-channel PCM data including at least front center channel audio signal data.

6. A video and audio reproducing system, comprising:

the transmission signal processing device according to claim 1;

a transmission signal demultiplexing circuit for receiving the output transmission signal data from the transmission signal processing device and demultiplexing the output transmission signal data into a video signal and front channel audio signal data; and a display device, the display device including a display for displaying the video signal, a D/A converter for converting the front center channel audio signal data to a front center channel audio signal, at least one channel of an amplifier and a speaker for reproducing the front center channel audio signal.

7. The video and audio reproducing system according to claim 6, wherein the display device includes two channels of amplifiers and speakers for reproducing the front center channel audio signal.

8. The video and audio reproducing system according to claim 6, wherein the display device includes an amplifier and a speaker for reproducing the low frequency channel audio signal.

9. The video and audio reproducing system according to claim 6, wherein the display device receives the volume level control data and controls a gain of an amplifier for reproducing the front center channel audio signal and the low frequency channel audio signal.

10. A transmission signal processing device, comprising:

a transmission signal data demultiplexing circuit for receiving transmission signal data in which a video signal and a multi-channel audio signal are multiplexed together and for demultiplexing the received transmission signal data into video signal data and multi-channel audio signal data;

a decoder circuit for decoding the multi-channel audio signal data to output a plurality of multi-channel audio signal data including at least front center channel audio signal data and low frequency channel audio signal data;

a transmission signal data multiplexing circuit for multiplexing together the video signal data and the front center channel audio signal data to obtain output transmission signal data;

a control circuit for controlling the transmission signal data demultiplexing circuit, the decoder circuit and the transmission signal data multiplexing circuit;

a volume level control data output circuit for outputting the volume level control data from the control circuit; and a volume adjustment circuit for adjusting a volume level of the multi-channel audio signal based on volume level control data output from the control circuit, the volume adjustment circuit including a multiplier that multiplies each of the plurality of decoded multi-channel audio signal data by a coefficient determined based on the volume level control data to convert each multi-channel audio signal data to multi-channel audio signal data whose volume level has been adjusted, and an attenuator for adjusting a volume level of a multi-channel audio output signal, which is obtained by converting each of the decoded multi-channel audio signal data into an analog signal, in a manner such that the volume level is linked with the coefficient determined based on the volume level control data;

wherein the transmission signal data multiplexing circuit at least one of:

multiplexes the video signal data, the front center channel audio signal data, and the low frequency channel audio signal data to obtain the output transmission signal data, where the volume level of the front center channel audio signal data has been adjusted, and multiplexes the video signal data with the front center channel audio signal data on an input side of the multiplier of the volume adjustment circuit to obtain the output transmission signal data, in which case the volume level control data is output by the volume level control data output circuit.

11. The transmission signal processing device according to claim 10, wherein:

the decoder circuit adds decoded front left channel audio signal data and decoded front right channel audio signal data to the front center channel audio signal data; and the transmission signal data multiplexing circuit multiplexes the video signal data with the front center channel audio signal data, which is obtained by adding the front left channel audio signal data and the front right channel audio signal data, to obtain output transmission signal data.

12. The transmission signal processing device according to claim 10, wherein the front center channel audio signal data input from the decoder circuit to the transmission signal data multiplexing circuit is stereophonic PCM (Pulse Code Modulation) data, in which a PCM left channel signal and a PCM right channel signal contain the front center channel audio signal data at an equal level.

13. The transmission signal processing device according to claim, wherein:

the decoder circuit outputs front left channel audio signal data and front right channel audio signal data; and the transmission signal data multiplexing circuit multiplexes together the video signal data, the front center channel audio signal data, the front left channel audio signal data and the front right channel audio signal data to obtain output transmission signal data.

14. The transmission signal processing device according to claim 13, wherein the transmission signal data to be transmitted in a multiplexed form is multi-channel PCM data including at least front center channel audio signal data.

15. A video and audio reproducing system, comprising:

the transmission signal processing device according to claim 10;

a transmission signal demultiplexing circuit for receiving the output transmission signal data from the transmission signal processing device and demultiplexing the output transmission signal data into a video signal and front channel audio signal data; and a display device, the display device including a display for displaying the video signal, a D/A converter for converting the front center channel audio signal data to a front center channel audio signal, at least one channel of an amplifier and a speaker for reproducing the front center channel audio signal.

16. The video and audio reproducing system according to claim 15, wherein the display device includes two channels of amplifiers and speakers for reproducing the front center channel audio signal.

17. The video and audio reproducing system according to claim 15, wherein the display device includes an amplifier and a speaker for reproducing the low frequency channel audio signal.

18. The video and audio reproducing system according to claim 15, wherein the display device receives the volume level control data and controls a gain of an amplifier for reproducing the front center channel audio signal and the low frequency channel audio signal.

* * * * *